July 10, 1945.  H. H. CANNON  2,379,864

CRANKCASE OIL PURIFIER

Filed April 7, 1942

H. H. CANNON
INVENTOR

ATTORNEY

Patented July 10, 1945

2,379,864

UNITED STATES PATENT OFFICE 2,379,864

CRANKCASE OIL PURIFIER

Hugh Harley Cannon, Los Angeles, Calif.

Application April 7, 1942, Serial No. 438,046

2 Claims. (Cl. 210—164)

The invention pertains to the class of oil purifiers which are attached to and operated by an internal combustion engine and which continuously filter a stream of oil drawn from the crankcase and returned thereto.

The type of purifier now in common use is arranged on the discharge of a pressure pump, usually the pump which supplies forced feed to the engine. The filtering element operates with a relatively high superatmospheric pressure on its intake side and discharges into the crankcase at atmospheric pressure.

I depart from this conventional practice in supplying the filter with oil under substantially atmospheric pressure and in maintaining the discharge side of the filter under a fluctuating subatmospheric pressure, to-wit, the pressure existing momentarily in the intake manifold of the engine.

In this departure from conventional practice I realize two notable advantages: the first in a more efficient use of the filtering element for the removal of suspended solids from the circulated oil than is realized in operation at higher pressures; the second in removing from the oil at least a part and sometimes all of the water and gasoline ends which tend to accumulate in the crankcase and depreciate the quality of the oil. This latter function is not performed in even a slight degree by the conventional pressure filtration systems.

A discussion of these advantages and the rationale thereof will be found following the description of a preferred form of apparatus illustrated in the attached drawing, in which Fig. 1 is a vertical section through the assembly, certain interior parts being shown in elevation;

Figure 1:
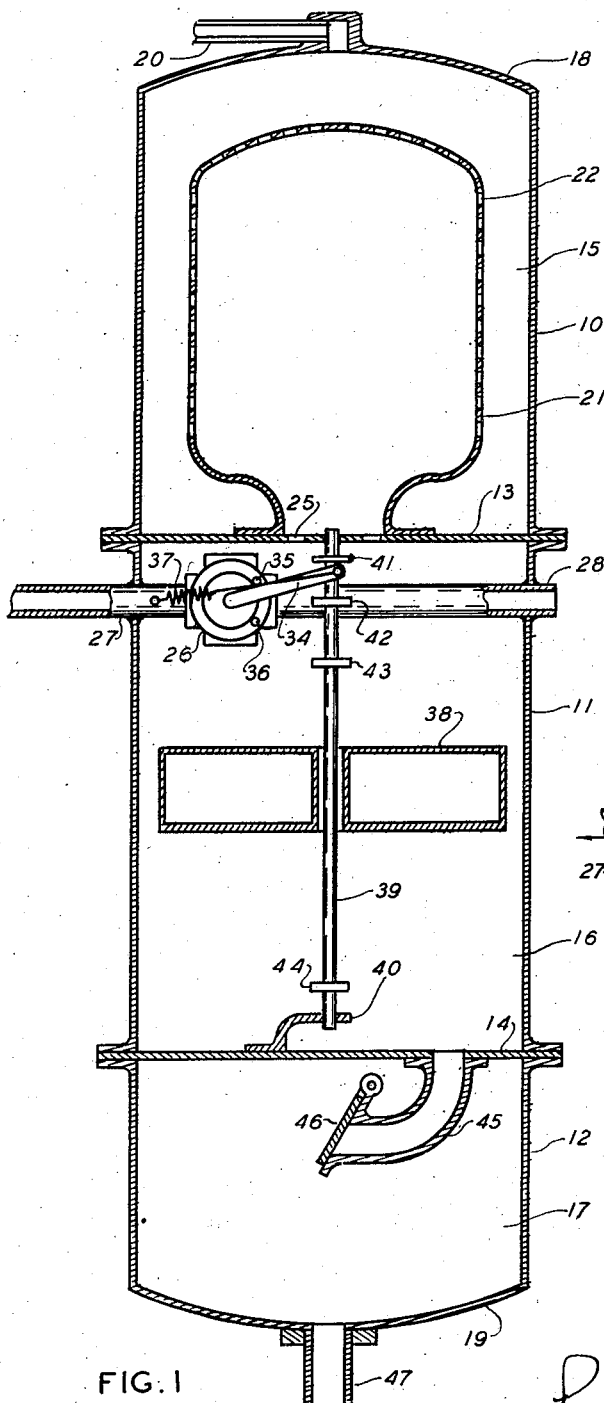

Referring to the drawing, three cylindrical shells 10, 11, and 12 are separated by diaphragms 13 and 14 to form three chambers 15, 16, and 17. These shells and the upper and lower heads 18 and 19 are of such form and thickness as to withstand an externally applied pressure of at least 15 pounds per square inch. The three sections are removably and nonleakably joined in any convenient manner, as by clamps or small bolts not shown.

Figure 3:
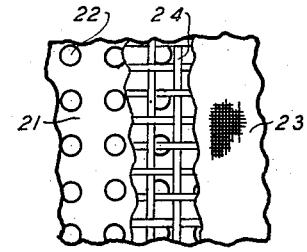
Fig. 3 is a fragmental view of a portion of the filtering element 21 and its two layers of covering material.

The upper or filtering chamber 15 is provided with an inlet connection 20 extending to some convenient point in the lower side of the engine crankcase, to bring a supply of oil to the filter. This chamber is also provided with a filtering element 21 of sheet metal, perforated with many small holes 22. The perforate element may be covered with cotton cloth or fine wire gauze as indicated at 23 in Fig. 3. It is desirable to interpose between the cloth and the perforate metal a layer 24 of coarse mesh wire screen to facilitate the movement into the perforations of oil which has passed through the cloth. Alternatively the supporting element 21 may be formed of stiff and heavy wire mesh screen on which the filter cloth may be mounted directly. In either case the cloth sack is tied firmly around the neck at the lower end of the element.

The filtered oil passing into the interior of element 21 gravitates into the float chamber 16 through openings 25 in diaphragm 13. The float chamber is provided with a diversion valve 26 which may conveniently be carried on two tubes 27 and 28 sealed into the walls of shell 11. The first of these tubes extends to the engine intake manifold, connecting into it at any convenient point between the throttle valve and the engine; the second communicates with the atmosphere outside the chamber.

Figure 2:
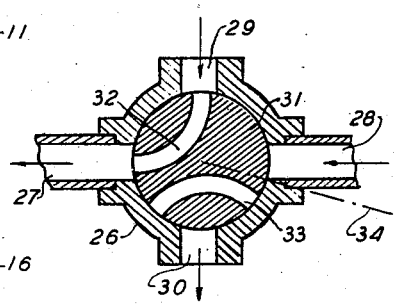
Fig. 2 is a detail cross section through the diversion valve 26 of Fig. 1.

Referring now to Fig. 2, the body of the valve has ports communicating with tubes 27 and 28 and two additional ports 29 and 30, both communicating with the interior of the float chamber. Within the valve body is fitted a rotatable plug 31 having internal channels 32 and 33. These channels are arranged to place tube 27 in communication with port 29 in the position of the plug shown in Fig. 2, and to place tube 28 in communication with port 30 in another position (that indicated in Fig. 1). The movement of the plug between these two positions is effected by an arm 34 the movement of which is limited by stops 35 and 36. This arm is provided with a tension spring 37 which completes its travel after passing over dead center.

Referring again to Fig. 1, the float chamber is provided with a float 38 guided by a float rod 39 which is longitudinally movable in a guide 40 attached to diaphragm 14 and in a perforation in diaphragm 13. The float rod is provided with two pairs of collars, 41—42 and 43—44, the first pair engaging the end of arm 34 to actuate the valve, the second pair engaging the float to actuate the float rod.

As the float chamber fills with oil draining down through openings 25, the float rises until it engages collar 43, thus lifting the rod and causing collar 42 to engage the lower side of arm 34 and to move the arm past its dead center, from which point the travel is completed by the tension of spring 37. This movement of the arm brings the plug 31 into the position in which port 33 places tube 28 and port 30 in communication while communication between tube 27 and port 29 is interrupted. Atmospheric air then enters through tube 28, breaking the vacuum and momentarily terminating filtration. The oil contained in the float chamber thereupon gravitates through a neck 45 attached to diaphragm 14, lifts the clapper valve 46 and flows through drain pipe 47 back to any convenient point in the engine crankcase.

When the oil level in the float chamber has subsided to the point at which float 38 engages collar 44 the reverse of the above movements takes place. Float rod 39 is urged downwardly, collar 41 engages the top of arm 34 and carries it over the center, spring 37 completes the travel of the arm and brings plug 31 to the position shown in Fig. 2. The entry of external air to the float chamber is thus shut off and the engine manifold placed in communication with the interior of the float chamber and, through openings 25, with the interior of filtering element 21. Filtration then begins and the float chamber starts to fill with filtered oil, thus completing the cycle.

The apparatus exemplified in the above description has two functions: to filter the oil and thus remove suspended solids, and to evaporate from the oil entrained water and dissolved gasoline.

The pressure drop across the filter is equal to the difference between atmospheric pressure and the momentary pressure in the intake manifold. In engines of the automotive type the intake pressure varies between 5 inches and 25 inches of mercury below atmosphere, or with atmospheric pressure at normal of 14.7 pounds, from 13 pounds to 3 pounds per square inch absolute. During the greater part of the time of operation of an automotive vehicle the manifold pressure is close to the lower end of the range, or from 3 pounds to 5 pounds absolute. At intervals corresponding to the periodicity of float operation the pressure drop across the filter falls to zero.

This fluctuation in filtering pressure, and the relatively low effective filtering pressure, have a highly beneficial effect on the useful life of the filtering element. The application of the high and constant pressure incident to the use of the conventional apparatus results in a very large flow through a fresh filtering element and in the rapid formation of a dense and impenetrable filter cake. As no flow rate larger than that required to keep the oil clean is useful, the too rapid choking of the filter has no compensating advantage. When subatmospheric filtering pressures are used, the initial flow rate is materially less but the cake formed is more open and permeable and the useful life of the filter is thus largely extended. Further, the "working" of the slightly resilient filter element which follows from fluctuation in pressure tends to move slimy colloids through the filter and thus maintain it in permeable condition. In brief, the effect of the reduced average pressure coupled with repeated pressure fluctuation is to cause the filtering element to deliver a reduced quantity of filtered oil, per unit of surface area, over a much extended period.

On emerging from the inner or discharge side of the filtering element the filtered oil is spread out in the form of a flowing film of large area. This film is subjected to the reduced pressure existing in the engine intake during its passage down the inner wall of the filter and on the upper surface of the pool collecting in the float chamber. The amount of evaporation of water and of gasoline ends thus produced is a function of the temperature of the oil and of the vapor pressure of each liquid over the pressure range existing in the float chamber and the filtering element. Under most circumstances the water contained in the oil will actually boil and be completely vaporized; thus the normal operating temperature of the automotive crankcase ranges from 150° to 200° Fahr. and the oil enters the filtering chamber at substantially the same temperature unless it be heated to a higher temperature deliberately. At 3 pounds absolute the boiling point of water is 141° and at 13 pounds absolute is 205° Fahr., so that even at 150° crankcase temperature the water would be gradually sweated out. Of course it is not necessary that the oil should be completely dried in one passage through the apparatus, as it is repeatedly circulated.

The heavy ends of gasoline which the oil tends to accumulate and which are not driven out of the crankcase at atmospheric pressure have considerably higher boiling points, but at any reduced pressure they have a positive vapor pressure by which they are sweated out more or less rapidly as the inlet manifold pressure fluctuates. Thus, while it is unlikely that at any time the oil will be completely stripped of gasoline ends, the quantity existing in the oil body is held to a constant, the magnitude of which will vary with the crankcase temperature (or the temperature to which the oil is heated) and the minimum manifold pressure in each specific engine as that engine is operated. In any case the maximum quantity of gasoline ends possible to accumulate in the oil is below the proportion which can cause serious dilution of the oil. When engine is idling, as at traffic intersections, manifold pressure is near minimum absolute.

Besides removing the water which exists as such in the circulated oil stream, the application of reduced pressures at relatively high temperature has the effect of dehydrating the slimy colloids (mainly heavy metal soaps) and thus coagulating them. In the dehydrated form they are amenable to filtration and thus are removed on the next passage through the filter, whereas in their hydrated form they pass through the filter or choke it rapidly if they do not so pass.

In the application of the above described principle to engines operating at relatively low crankcase temperatures, or to engines operating at constant load with an intake pressure only a few inches below atmosphere, it is desirable and may be necessary to heat the oil to a higher temperature, ordinarily somewhat above the boiling point of water, to ensure the desired stripping out of the gasoline ends. Heat may be applied to the oil stream during its passage from the crankcase to the filtering chamber, and exhaust heat may be used for that purpose. If the heat thus imparted is objectionable in the crankcase the stream draining down from the float chamber may be cooled in its return passage.

I claim as my invention:
1. Apparatus for purifying oil drawn from the crankcase of an internal combustion engine, comprising: a cylindrical casing vertically arranged and divided into an upper, a medial and a lower compartment by an upper and a lower horizontal partition: a hollow filtering element axially disposed within said upper chamber and mounted on said upper partition, the major part of the filtering surface thereof being vertically arranged; a channel communicating with said crankcase and discharging centrally onto the closed upper end of said filtering element; a port in said upper partition affording constant and unimpeded communication between the interior of said filtering element and said medial chamber; a reciprocable valve within said medial chamber, said valve having ports communicating with the interior of said chamber; channels connecting said valve respectively with the outside atmosphere and with the intake manifold of said engine; passages within said valve arranged to place said channels alternately in communication with said ports when said valve is reciprocated; a float within said medial chamber operatively connected with said valve to reciprocate the same and thereby to open said atmosphere channel and close said manifold channel as said medial chamber fills with filtered oil and to reverse said movements when said medial chamber empties; a channel affording communication between said medial chamber and said lower chamber and a gravity operated check valve arranged to permit downward flow and prevent upward flow of fluids through last said channel, and a channel affording communication between said lower chamber and said crankcase.

2. Apparatus for purifying oil drawn from the crankcase of an internal combustion engine, comprising: a vertically arranged casing divided into three chambers by horizontally disposed, spaced partitions; a vertically arranged, hollow filtering element in the uppermost of said chambers and means for delivering oil from said crankcase onto said element to flow over the vertical surfaces thereof; a port in the upper of said partitions affording constant and unimpeded communication between the interior of said filtering element and the medial of said chambers; independent channels passing through the wall of said medial chamber and communicating respectively with the atmosphere and with the intake manifold of said engine and float actuated valve means within said medial chamber, connected with said independent channels and adapted to place said channels alternately in communication with said medial chamber; a channel affording communication between said medial chamber and the lowermost of said chambers; a check valve in last said channel arranged to permit only downward flow of liquid therethrough, and a channel connecting said lowermost chamber with said crankcase.

HUGH HARLEY CANNON.